Sept. 19, 1933.    G. WAHNISH    1,927,427

LOCKING DEVICE FOR CAMERA SHUTTER OPERATING MEMBERS

Filed May 24, 1932

INVENTOR
GEORGE WAHNISH
BY
ATTORNEY

Patented Sept. 19, 1933

1,927,427

UNITED STATES PATENT OFFICE

1,927,427

LOCKING DEVICE FOR CAMERA SHUTTER-OPERATING MEMBERS

George Wahnish, New York, N. Y.

Application May 24, 1932. Serial No. 613,171

2 Claims. (Cl. 95—32)

The invention relates to photographic cameras, and more particularly to cameras of the type utilizing a film roll and embodying means for winding the film after each exposure upon a suitable take-up spool. In the operation of cameras thus utilizing a film roll, it frequently occurs that the operator neglects to advance the film after an exposure to provide an unexposed portion, with the result that a "double-exposure" is made upon the originally exposed film portion.

The present invention has for an object the provision of means in connection with the film-exposing mechanism whereby such double-exposure will be rendered impossible.

Another object of the invention resides in the provision of means of this nature suitable for use in connection with a camera of adjustable focus.

Still another object of the invention resides in the provision of a shutter-locking device which will permit of only one operation of the shutter-operating member of the camera until a succeeding unexposed film portion has again been advanced into position.

A still further object of the invention is to admit of temporarily rendering the shutter-locking device inoperative, as when making time or bulb exposures.

In carrying out the invention, means are provided for effecting engagement with the usual shutter-operating member of the camera and for becoming so placed in relation to said member, during its operation to effect an exposure of a film portion, that the said shutter-operating member may not again be moved until the film-advancing mechanism has been actuated to advance a further film portion.

The nature of the invention, however, will best be understood when described in connection with the accompanying drawing, in which.

Figure 1:
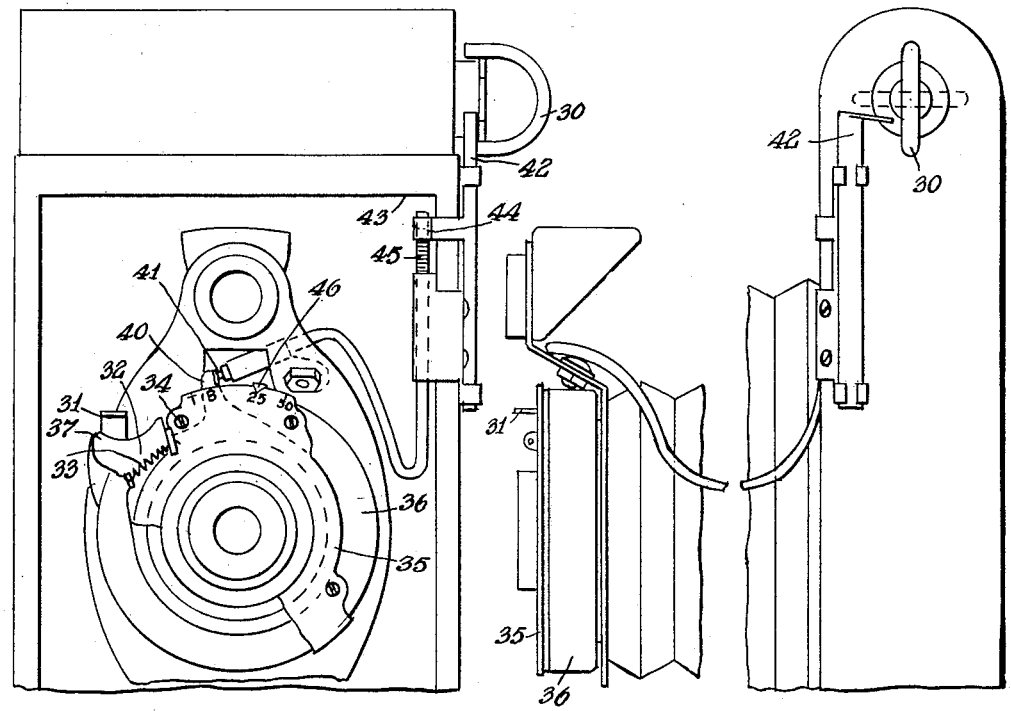
Fig. 1 is a fragmentary front elevation, and Fig. 2 a similar end elevation illustrating a camera of the folding type and of adjustable focus and equipped with the device for locking its shutter-operating member.
Figure 2:
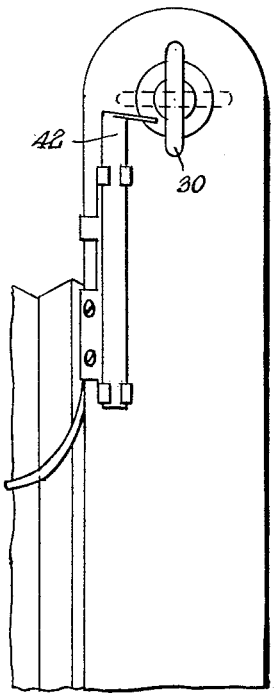

Referring to the drawing, there is disclosed a camera of the adjustable-focus type and embodying the usual means for advancing a film-strip therethrough for exposure of successive portions, the film being advanced by a film-wind member 30; and in accordance with the invention, provision is made for accommodating the changing distances between the said film-wind 30 of the camera and the usual shutter-operating member or finger piece 31. Thus, a plate 32 is mounted to oscillate about the optical axis of the camera, for example, upon its shutter barrel, and is spring-drawn by means of the spring 33, for example, in a clockwise direction toward a stop such as is provided by the shouldered screw 34 securing the dial plate 35 to the shutter mount 36 and between which and the said plate the plate 32 is designed to oscillate.

Figure 3:
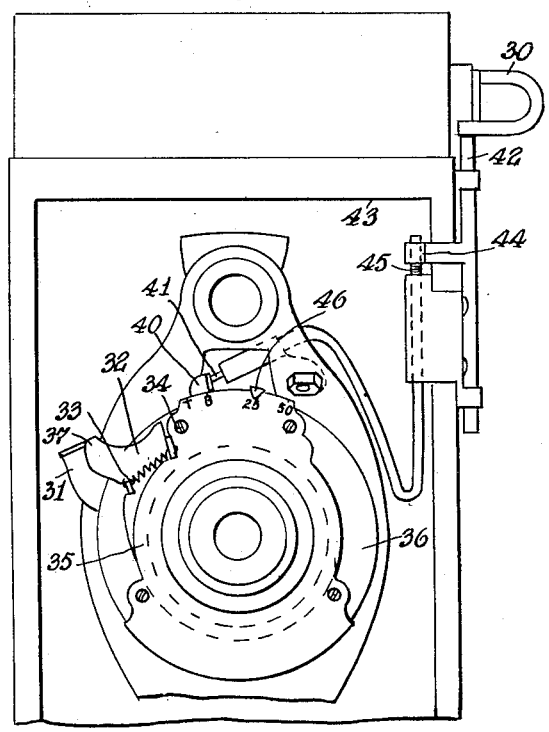
Fig. 3 is a fragmentary front elevation illustrating the position of the locking device and shutter-operating member after an exposure and prior to the advance of a new film portion.

The plate 32 is provided, furthermore, with a more or less radially extending finger 37 in juxtaposed relationship to the finger piece 31 for operating the shutter of the camera; and this finger piece is designed to contact with the said radially extending finger 37 in the taking of a picture (depressing said finger piece) and to ride beyond the same as indicated in Fig. 3 of the drawing. The yielding of spring 33 permits this action and at the same time the spring returns the plate 32 to its normal position and causes said finger piece to be locked behind the finger 37 to render the camera inoperative for further exposures.

To effect the release of the finger piece 31, a further finger 40 is arranged to project more or less radially from the said plate and to be engaged by means operated from the rotation of the film-wind 30 for the purpose of oscillating said plate in a counterclockwise direction. This causes the finger 37 to clear the finger piece 31 which returns to its normal position for further exposure, being spring-urged in the usual manner to reset the shutter mechanism, as is well understood.

For effecting the movement of this plate as aforesaid, the finger 40 is arranged to be engaged by the movable projecting end 41 of a Bowden cable, the other and inner end being moved from the film wind 30 through engagement by the latter with a reciprocable rod 42 slidably mounted at the side of the case 43 of the camera and having a lateral extension 44 for engagement with the said inner end of the cable. Moreover, a spring 45 coiled about said inner end of the cable is designed to normally urge the same and attached slidable extension 44 in a direction toward the film-wind 30.

Thus, as said film-wind is rotated for advancing a film portion into position, the cable will be actuated and through its projecting end 41 will serve to oscillate plate 32 as a result of the engagement with its finger 40, so that the shutter may again be operated for exposure of the newly presented film portion. For time and bulb exposures, the time and bulb set finger 46 will, when moved to the respective dial positions for time or bulb, engage the finger 40 to move plate 32 counterclockwise and thereby finger 37 to a position to cause it to clear the finger piece 31 and permit it to operate freely.

By the hereinbefore described expedients, double-exposure of a film portion is rendered impossible, and, moreover, the locking mechanism may be utilized to insure against accidental operation of the shutter mechanism if the film be not brought into position until it is desired to actually make an exposure.

I claim:

1. The combination with a rollfilm camera shutter-operating member and the film-wind of the camera; of a spring-urged member oscillatable about the optical axis of the camera lens and having a pair of radially extending fingers, the one finger being adapted for engagement with the said shutter-operating member and actuated by movement of the same for location relatively thereto to block further operation of said shutter member, and means actuated by the film-wind for engaging the other finger of said oscillatable member to release the shutter-operating member from the locking engagement with said first-named finger.

2. The combination with a rollfilm camera shutter-operating member and the film-wind of the camera; of a spring-urged oscillatable member having a pair of radially extending fingers, the one finger being adapted for engagement with the said shutter-operating member and actuated by movement of the same for location relatively thereto to block further operation of said shutter member, a Bowden cable having a movable end adapted for engagement with the other finger of said oscillatable member, and reciprocable means secured to the opposite end of said cable and spring-urged toward the film-wind for engagement therewith to move the said other finger and thereby said oscillatable member to disengage the first-named finger and the shutter-operating means.

GEORGE WAHNISH.